J. R. Adam's Imp'd Coffe Mill.
72259
PATENTED
DEC 17 1867
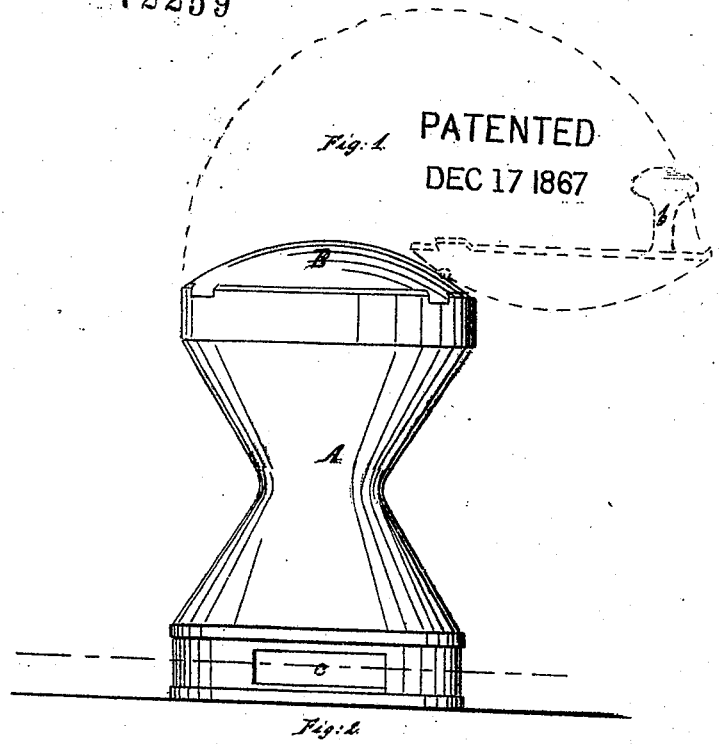
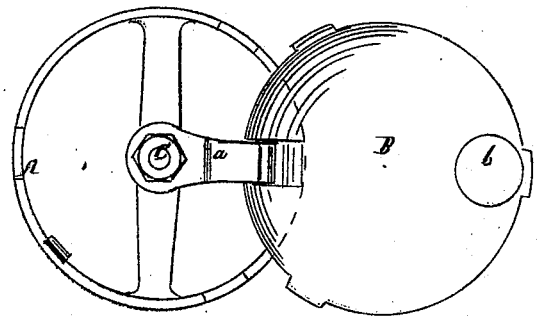
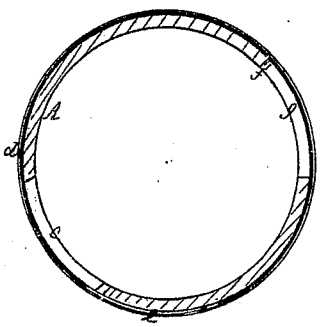
Witnesses:
C. L. Topliff
J. M. Covington
Inventor.
J. R. Adams

United States Patent Office.

JOHN R. ADAMS, OF NEW YORK, N. Y.

Letters Patent No. 72,259, dated December 17, 1867.

---

IMPROVEMENT IN COFFEE-MILLS.

---

The Schedule referred to in these Letters Patent and making part of the same.

---

TO ALL WHOM IT MAY CONCERN:

Be it known that I, J. R. ADAMS, of the city, county, and State of New York, have invented a new and improved Coffee-Mill; and I do hereby declare that the following is a full, clear, and exact description thereof, which will enable others skilled in the art to make and use the same, reference being had to the accompanying drawing, forming part of this specification, in which—

Figure 1 represents a side elevation of this invention.

Figure 2 is a plan or top view of the same.

Figure 3 is a horizontal section of the same, the plane of section being indicated by the line $x$ $x$, fig. 1.

Similar letters of reference indicate like parts.

This invention relates to a coffee-mill, the lid of which is hinged to an arm extending from the top of the shaft, to which the grinder is secured, said lid being provided with a handle secured to its inner surface in such a manner that, when the lid is opened, it takes the place of the crank, by which the grinder is set in motion, and when the lid is closed, the whole mill is brought in a compact form, which can easily be packed or stored away in a small space. The body of the mill is made in the form of a double cone, and it is provided with an aperture near its bottom, through which the ground coffee can be discharged. Said opening is opened and closed by a ring, which swivels on the body of the mill, and which is provided with an aperture, so that, when the aperture of the ring registers with the opening in the body of the mill, the ground coffee can be discharged, and when the ring is turned to such a position that its aperture does not register with the opening in the mill, the space containing the ground coffee is securely closed, and the same is not liable to open spontaneously.

A represents the body of my mill, which is made in the form of a double cone, as shown in fig. 1. The upper cone forms the hopper, and the inner surface of the lower cone forms the concave grinding-surface, which corresponds to the grinding-cone, so that, by turning said cone, coffee or other articles placed into the hopper are ground in the ordinary manner. Said hopper is provided with a lid, B, which is hinged to an arm, $a$, extending from the central shaft C, and which is provided with a handle, $b$, secured in its inner surface, as clearly shown in fig. 1, where the lid is shown closed in black, and open in red outlines, and also in fig. 2, where the lid is shown open. When the lid is open, it takes the place of the crank, by means of which motion is imparted to the grinder, and when the lid is closed, the entire mill assumes a compact form, convenient for packing or storing in a small compass, and all its parts are fully protected, and not liable to sustain any injury, if it (the mill) is thrown about or roughly handled.

The lower portion of the body of the mill is cylindrical, and provided with an aperture, $c$, through which the ground coffee can be discharged. This aperture is opened or closed by a ring, $d$, which swivels on the cylindrical part of the body of the mill, and which is provided with an opening, $e$. When the opening registers with the aperture $c$, the ground coffee can be discharged, but when the ring is turned to such a position that said opening does not register with the aperture $c$, the space containing the ground coffee is securely closed, and there is no danger that the same will open spontaneously. A pin, $f$, projecting from the inner surface of the ring, and working in a slot, $g$, in the body of the mill, prevents the ring being turned any further than necessary either to open or close the aperture $c$.

This mill is exceedingly compact in its construction. It is conveniently handled, can be stored away in a small space, and is very durable.

I claim as new, and desire to secure by Letters Patent—

The pivoted lid of the mill, attached by an arm to the grinder-shaft, for the purpose of turning the grinding-cone, as described.

The above specification of my invention signed by me, this 22d day of July, 1865.

JOHN R. ADAMS.

Witnesses:
M. M. LIVINGSTON,
C. L. TOPLIFF.